(12) United States Patent
Russell

(10) Patent No.: US 11,685,659 B2
(45) Date of Patent: Jun. 27, 2023

(54) PROCESSES AND APPARATUSES FOR REDUCING CARBON MONOXIDE LEVELS IN A GASEOUS STREAM

(71) Applicant: UOP LLC, Des Plaines, IL (US)

(72) Inventor: Bradley Russell, Carol Stream, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 17/535,173

(22) Filed: Nov. 24, 2021

(65) Prior Publication Data

US 2023/0159338 A1 May 25, 2023

(51) Int. Cl.
*C01B 32/50* (2017.01)
*C01B 5/00* (2006.01)
*B01D 53/86* (2006.01)
*B01D 53/047* (2006.01)

(52) U.S. Cl.
CPC ............ *C01B 32/50* (2017.08); *B01D 53/047* (2013.01); *B01D 53/864* (2013.01); *C01B 5/00* (2013.01); *B01D 2257/502* (2013.01)

(58) Field of Classification Search
CPC ......... C01B 32/50; C01B 5/00; B01D 53/047; B01D 53/864; B01D 2257/502; B01D 53/62; B01D 2251/102; B01D 2251/202; B01D 2251/204; B01D 2256/22
See application file for complete search history.

(56) References Cited

U.S. PATENT DOCUMENTS

| | | | |
|---|---|---|---|
| 4,572,829 A | 2/1986 | Fuderer | |
| 4,816,237 A * | 3/1989 | Tomomura | ......... B01D 53/0476 423/247 |
| 5,110,569 A * | 5/1992 | Jain | ...................... F25J 3/04169 422/612 |
| 5,643,542 A | 7/1997 | Leyrer et al. | |
| 5,669,960 A * | 9/1997 | Couche | .................... C01B 3/56 95/143 |
| 6,254,848 B1 | 7/2001 | Autenrieth et al. | |
| 6,964,692 B2 * | 11/2005 | Gittleman | .............. B01D 53/06 48/107 |
| 7,147,947 B2 | 12/2006 | Wu et al. | |
| 7,510,696 B2 | 3/2009 | Herb et al. | |
| 8,221,693 B2 | 7/2012 | Shore et al. | |
| 8,226,912 B2 * | 7/2012 | Kloosterman | ........... C10K 1/00 423/437.1 |
| 8,323,602 B2 | 12/2012 | Wright et al. | |
| 2003/0152497 A1 | 8/2003 | Giacobbe et al. | |
| 2006/0029841 A1 | 2/2006 | Conrad et al. | |
| 2007/0178035 A1 * | 8/2007 | White | ..................... C01B 32/50 423/220 |
| 2008/0173584 A1 * | 7/2008 | White | .................... F25J 3/0223 210/656 |
| 2011/0223083 A1 * | 9/2011 | Bialkowski | ............. C01B 32/50 423/220 |
| 2012/0128563 A1 * | 5/2012 | Cullen | ................ H01M 8/0662 423/245.1 |
| 2013/0131380 A1 | 5/2013 | Dubois et al. | |
| 2014/0230445 A1 | 8/2014 | Huntington | |
| 2019/0135626 A1 | 5/2019 | Rafati et al. | |

FOREIGN PATENT DOCUMENTS

| | | | | |
|---|---|---|---|---|
| AU | 2010272097 A1 | 1/2012 | | |
| CN | 102428024 A | 4/2012 | | |
| CN | 110 252 291 A | * | 9/2019 | .......... B01J 23/8926 |
| EP | 2404656 A2 | 1/2012 | | |
| EP | 2455336 A1 | 5/2012 | | |
| JP | 4162422 B2 | 10/2008 | | |
| JP | 5416513 B2 | 2/2014 | | |
| JP | 5629259 B2 | 11/2014 | | |
| JP | 5795280 B2 | 10/2015 | | |
| JP | 2019063778 A | 4/2019 | | |
| KR | 2011 093 640 A | * | 8/2011 | ........... B01D 53/047 |

OTHER PUBLICATIONS

Newton, Mark A. et al., Room Temperature Carbon Monoxide Oxidation by Oxygen over Pt/Al2O3 Mediated by Reactive Platinum Carbonates, Nature Communications, 6:8675, 2015. DOI: 10.1038/ncomms9657.
Dhai, Ganesh Chandra, Catalytic Conversion of Carbon Monoxide into Carbon Dioxide Over Spinel Catalysts: An Overview, Materials Science for Energy Technologies 2 (2019) 575-588.
International Search Report from corresponding PCT application No. PCT/US2022/080138, dated Mar. 17, 2023.
Written Opinion from corresponding PCT application No. PCT/US2022/080138, dated Mar. 17, 2023.

* cited by examiner

Primary Examiner — Timothy C Vanoy

(57) ABSTRACT

Processes for reducing carbon monoxide levels in a carbon dioxide rich gaseous stream. The carbon dioxide rich stream is passed to a preferential oxidation zone to selectively convert carbon monoxide to carbon dioxide. Excess oxygen is consumed by reacting with hydrogen, which may be added or controlled based on PSA operating conditions upstream of the preferential oxidation zone. The preferential oxidation zone may be contained within a bed of a dryer.

19 Claims, 1 Drawing Sheet

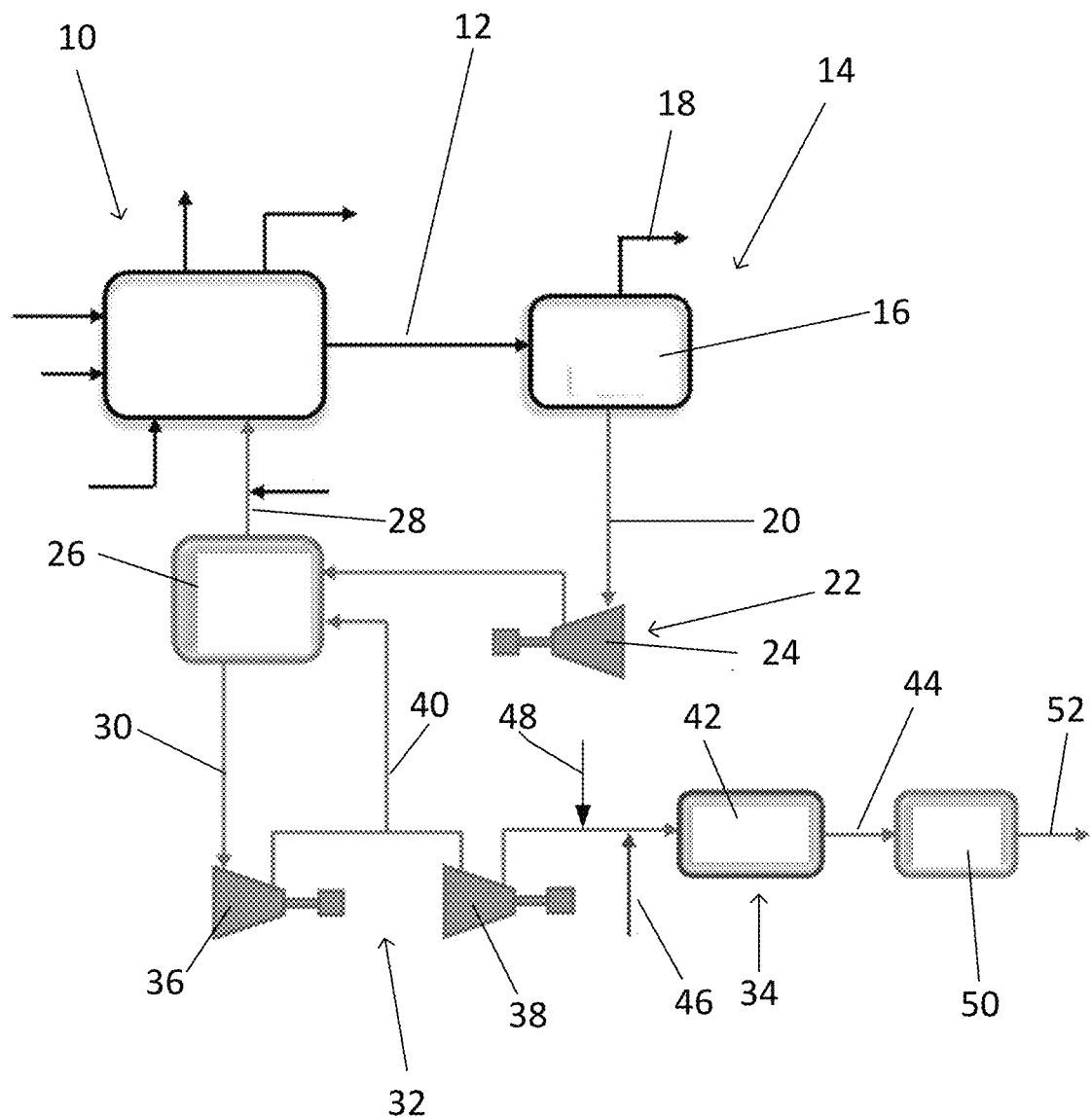

PROCESSES AND APPARATUSES FOR REDUCING CARBON MONOXIDE LEVELS IN A GASEOUS STREAM

FIELD OF THE INVENTION

This invention relates generally to processes and apparatuses that reduce carbon monoxide levels in a gaseous stream, and more particularly to gaseous streams that also include carbon dioxide.

BACKGROUND OF THE INVENTION

There are many chemical processes that produce gaseous streams that contain both carbon monoxide and carbon dioxide. Various processes are utilized for removing carbon monoxide from carbon dioxide streams. In addition, there are often stringent limits on the amount of carbon monoxide in such streams, including parts-per-million (ppm) level limits.

Currently, catalytic oxidation (CATOX) is used for post-treatment of enriched carbon dioxide streams. CATOX uses oxygen injection and a palladium catalyst with operating temperatures greater than 400° C. (752° F.). The CATOX reactions are non-selective oxidation of carbon monoxide and other combustible components, including methane and hydrogen. Generally, excess oxygen is required, leading to downstream contamination of the carbon dioxide product with oxygen and further oxygen removal steps.

Therefore, there remains a need for an effective and efficient low-temperature process for reducing carbon monoxide levels in a carbon dioxide stream without oxygen contamination of the carbon dioxide product.

SUMMARY OF THE INVENTION

One or more processes have been invented in which a preferential oxidation is performed. This reaction can use air (or oxygen or oxygen enriched air) and has a lower operating temperature (50 to 200° C. (122 to 392° F.)). The present processes fully consume oxygen, thus eliminating costly downstream oxygen removal. The present processes, inter alia, improve operational robustness of upstream carbon dioxide recovery processes by being less sensitive to feed compositional variations, reduce the risk of exceeding carbon monoxide limits, and increase performance with a higher carbon dioxide recovery and lower specific power consumption.

Therefore, the present invention may be characterized, in at least one aspect, as providing a process for reducing carbon monoxide levels in a gaseous stream by: providing a carbon dioxide stream having greater than 90 mol % carbon dioxide, and further including carbon monoxide, hydrogen, and at least one of water, methane, nitrogen, or a combination thereof; mixing the carbon dioxide stream with oxygen to provide a mixed stream; and passing the mixed stream to a preferential oxidation zone having a vessel containing a catalyst and being operated at a temperature of between 50 and 200° C. in order to selectively convert carbon monoxide to carbon dioxide and consume excess oxygen by reaction with hydrogen to form water.

The oxygen may be from air or from oxygen-enriched air.

The process may further include comprising adjusting an amount of oxygen mixed with the carbon dioxide stream such that the molar ratio of oxygen ($O_2$) to carbon monoxide is in the range of 0.5 to 2.5 moles $O_2$ per mole of carbon monoxide.

The process may further include adjusting an amount of hydrogen passed to the preferential oxidation zone. It is contemplated that adjusting the amount of hydrogen includes mixing the carbon dioxide stream with a hydrogen stream. It is further contemplated that the oxygen concentration in the effluent stream from the preferential oxidation zone has less than about 50 ppmv $O_2$. The carbon dioxide stream may be a PSA tail gas stream from a PSA unit. Accordingly, adjusting the amount of hydrogen may include changing the operating conditions of the PSA unit to increase an amount of hydrogen in the PSA tail gas stream.

The present invention may also be generally characterized as providing a process for reducing carbon monoxide levels in a gaseous stream by: providing a carbon dioxide stream having greater than 90 mol % carbon dioxide, and further including carbon monoxide, hydrogen, and at least one of water, methane, nitrogen, or a combination thereof; mixing the carbon dioxide stream with oxygen to provide a mixed stream; passing the mixed stream to a preferential oxidation zone having a vessel containing a catalyst and being operated at conditions in order to selectively convert carbon monoxide to carbon dioxide and consume excess oxygen by reaction with hydrogen to form water; and, adjusting an amount of hydrogen passed to the preferential oxidation zone so that the oxygen concentration in the effluent stream from the preferential oxidation zone is less than about 50 ppmv $O_2$.

Adjusting the amount of hydrogen may include mixing the carbon dioxide stream with a hydrogen stream.

The carbon dioxide stream may be a PSA tail gas stream from a PSA unit. Accordingly, adjusting the amount of hydrogen may include changing the operating conditions of the PSA unit to increase an amount of hydrogen in the PSA tail gas stream. The oxygen may be from air or from oxygen-enriched air.

In at least one aspect the present invention may be broadly characterized as providing a process for reducing carbon monoxide levels in a gaseous stream by: providing a carbon dioxide stream having greater than 90 mol % carbon dioxide, and further including carbon monoxide, hydrogen, and at least one of water, methane, nitrogen, or a combination thereof; mixing the carbon dioxide stream with oxygen to provide a mixed stream; and, passing the mixed stream to a preferential oxidation zone having a vessel containing a catalyst and being operated at conditions in order to selectively convert carbon monoxide to carbon dioxide and consume excess oxygen by reaction with hydrogen to form water.

The vessel containing a catalyst may be a drier. The process may also include adjusting an amount of hydrogen passed to the preferential oxidation zone. Adjusting the amount of hydrogen may include mixing the carbon dioxide stream with a hydrogen stream. The oxygen concentration in the effluent stream from the preferential oxidation zone may be less than about 50 ppmv $O_2$. The carbon dioxide stream may be a PSA tail gas stream from a PSA unit. Adjusting the amount of hydrogen may therefore include changing the operating conditions of the PSA unit to increase an amount of hydrogen in the PSA tail gas stream.

It is contemplated that the mixed stream is maintained at a temperature between 60 and 100° C.

Additional aspects, embodiments, and details of the invention, all of which may be combinable in any manner, are set forth in the following detailed description of the invention.

DETAILED DESCRIPTION OF THE DRAWINGS

One or more exemplary embodiments of the present invention will be described below in conjunction with the following drawing figures, in which:

FIG. 1 is a schematic process flow diagram according to one or more embodiments of the present invention.

DETAILED DESCRIPTION OF THE INVENTION

As mentioned above, the present processes utilize a preferential oxidation zone to reduce the amount of carbon monoxide in a carbon dioxide rich stream. The oxidation effluent has lower levels of oxygen compared with other processes and therefore does not require oxygen treatment in order to meet typical oxygen limits of less than 50 ppmv or less than 20 ppmv or less than 10 ppmv.

With these general principles in mind, one or more embodiments of the present invention will be described with the understanding that the following description is not intended to be limiting.

As shown in FIG. 1, a reaction zone 10 produces an effluent stream 12 that includes carbon dioxide, carbon monoxide, and hydrogen. The effluent stream 12 may also include water, methane or other light hydrocarbons, and nitrogen. The reaction zone 10 may be a steam methane reforming zone, an autothermal reforming zone, a partial oxidation zone, or a gasification zone. The exact type of reaction zone 10 is not important for the practicing of the present invention.

In order to recover the hydrogen, the effluent stream 12 may be passed to a hydrogen purification zone 14 which may include a hydrogen pressure swing adsorption (PSA) unit 16. The hydrogen PSA unit 16, as is known, generally includes four or more adsorption vessels, and each vessel includes a plurality of adsorbent layers.

In the hydrogen PSA unit 16, a multicomponent gas, in this case, the effluent stream 12, is typically fed to at least one of a plurality of adsorption beds at an elevated pressure effective to adsorb at least one component, while at least one other component passes through. At a defined time, feed to the adsorber is terminated and the bed is depressurized by one or more co-current depressurization steps wherein pressure is reduced to a defined level which permits the separated, less-strongly adsorbed component or components remaining in the bed to be drawn off without significant concentration of the more-strongly adsorbed components. Then, the bed is depressurized by a countercurrent depressurization step wherein the pressure on the bed is further reduced by withdrawing desorbed gas counter-currently to the direction of is feed. Finally, the bed is purged and repressurized. The final stage of re-pressurization is with product gas or feed gas.

In the depicted processes, the hydrogen PSA unit 16 produces an enriched hydrogen stream 18 being mostly hydrogen. Relative to the effluent stream 12, the enriched hydrogen stream 18 from the hydrogen PSA unit 16 has a higher concentration of hydrogen. The hydrogen PSA unit 16 also produces a hydrogen PSA tail gas stream 20 that includes the carbon dioxide and carbon monoxide, and any additional components of the effluent stream 12 such as water, methane, nitrogen, argon, and mixtures thereof. Relative to the effluent stream 12, the hydrogen PSA tail gas stream 20 from hydrogen PSA unit 16 is depleted in hydrogen or has a lower concentration of hydrogen. The hydrogen PSA tail gas stream 20 may be passed to a compression zone 22 including a compressor 24 to increase its pressure and then passed to a carbon dioxide PSA unit 26.

As with the hydrogen PSA unit 16, the carbon dioxide PSA unit 26 uses a plurality of vessels to selectively separate components from the hydrogen PSA tail gas stream 20 to produce a first stream 28 that is depleted in carbon dioxide and may be recycled to the reaction zone 10 as a fuel gas and a second stream that is a carbon dioxide enriched PSA tail gas stream 30. The carbon dioxide PSA tail gas stream 30 is typically greater than 90 mol % or greater than 95 mol % carbon dioxide, and further includes residual carbon monoxide, hydrogen, and at least one of water, methane, nitrogen, or a combination thereof. Compared with the hydrogen PSA tail gas stream 20, the carbon dioxide PSA tail gas stream 30 has a higher percentage of carbon dioxide and is thus enriched in carbon dioxide.

As noted above, the carbon dioxide PSA tail gas stream 30 may include an amount of carbon monoxide that exceeds specified limits and therefore it must be reduced. Conventional solutions use non-selective catalytic oxidation for the treatment of this stream. The present invention provides various processes for effectively and efficiently reducing the amount of carbon monoxide in this type of stream by using oxygen with a selective oxidation catalyst. The non-selective catalytic oxidation results in oxidation of all species in the stream, which also requires excess oxygen and thus, further oxygen removal.

Accordingly, as shown in FIG. 1, the carbon dioxide PSA tail gas stream 30 may be compressed in a compression zone 32 and then passed to a preferential oxidation zone 34. The compression zone 32 may include two or more compressors 36, 38, and an interstage product 40 may be returned to the carbon dioxide PSA unit 26 in order to increase the carbon dioxide enrichment.

Generally, the preferential oxidation zone 34 includes a vessel 42 containing a catalyst and being operated at a temperature between 50 to 200° C. (122 to 392° F.), or between 60 to 120° C. (140 to 248° F.) in order to selectively convert carbon monoxide to carbon dioxide and provide an oxidation effluent stream 44 that has less than 50 ppmv oxygen, or less than 20 ppmv oxygen, or less than 10 ppmv oxygen. Thus, the preferential oxidation zone 34 also receives oxygen via an air stream 46 (that may be enriched with additional oxygen) and that may be mixed with the carbon dioxide PSA tail gas stream 30. The temperature of such a mixed stream may be maintained to be between 50 to 200° C. (122 to 392° F.), or 60 to 120° C. (140 to 248° F.). These temperature ranges are believed to be lower than conventional catalytic oxidation processes.

Excess oxygen in the preferential oxidation zone 34 is consumed by hydrogen, and accordingly, hydrogen may added to the preferential oxidation zone 34 to ensure (near) complete reaction of oxygen. Accordingly, a stream of hydrogen 48 may be mixed with the carbon dioxide PSA tail gas stream 30. Alternatively, the amount of hydrogen passed to the preferential oxidation zone 34 may be based on the operating conditions of the carbon dioxide PSA unit 26 and/or the hydrogen PSA unit 16. In other words, one or both of the upstream PSA units 16, 26 may be operated to ensure that a sufficient amount of hydrogen slips into the tail gas streams 20, 30 and is passed into the preferential oxidation zone 34 to ensure (near) complete reaction of all of the oxygen passed to the preferential oxidation zone 34. Generally, a molar ratio of oxygen ($O_2$) to carbon monoxide in the preferential oxidation zone 34 is in the range of 0.5 to 2.5 moles $O_2$ per mole of carbon monoxide.

The oxidation effluent stream 44 may be passed to a dryer 50. As is known, the dryer 50 dehydrates the oxidation effluent stream 44. Solid or liquid desiccants have both been used for this purpose. A dried, oxidation effluent stream 52 comprises a carbon dioxide rich stream that is lean in carbon monoxide and which does not require additional oxygen removal.

Although depicted as separate pieces of equipment in FIG. 1, it is contemplated that the dryer 50 and the preferential oxidation zone 34 be combined. For example, a catalyst layer in the dryer adsorber vessels 50 may include the selective catalyst for oxidation.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

For example, analysis could be done on the oxidation effluent stream 44 to ensure that oxygen is being consumed. If measured or determine values indicate excess oxygen in the oxidation effluent stream 44, the amount of hydrogen to the preferential oxidation zone 34 may be adjusted, by increasing the flow of the stream of hydrogen 48 and/or by adjusting conditions in one of the PSA units 16, 26.

Similarly, if an amount of carbon monoxide in the oxidation effluent stream 44 exceeds desired values, the amount of oxygen passed to the preferential oxidation zone 34 may be increased and/or the amount of hydrogen passed to the preferential oxidation zone 34 may be decreased. The adjustment to the oxygen may be increased the flow of air stream 46 or by increasing the oxygen mixed with the air stream 46.

Similarly, the flow rate of tail gas stream 30 can be measured and the carbon monoxide concentration in tail gas stream 30 can be continuously measured with an on-line carbon monoxide analyzer and the flow of the air stream 46 can be adjusted accordingly to achieve a desired oxygen ($O_2$) to carbon monoxide molar ratio in the range of 0.5 to 2.5.

EXPERIMENTS

Example 1

A computer simulation of a steam methane reforming hydrogen production process was performed, and results are given in TABLE 1 below. A $CO_2$ PSA unit was used on compressed hydrogen PSA tail gas from the process to recover an enriched carbon dioxide product stream. This $CO_2$ product stream was compressed in a gas compressor to form a compressed tail gas stream. As indicated in TABLE 1, this compressed tail gas stream comprises 2300 ppmv carbon monoxide, which exceeds the $CO_2$ product specification of less than 20 ppmv carbon monoxide. Therefore, a preferential oxidation (PrefOx) reactor was used to oxidize the carbon monoxide with oxygen from an air stream. In order to prevent oxygen contamination of the $CO_2$ product, a hydrogen stream was mixed with the feed stream to the PrefOx zone to consume excess oxygen. Carbon monoxide and hydrogen react with oxygen in the PrefOx zone to form carbon dioxide and water, respectively. The resulting effluent stream from the PrefOx zone comprises less than 10 ppmv oxygen and less than 20 ppmv carbon monoxide.

TABLE 1

|  | $CO_2$ Product from PSA Unit (Compressed Tail Gas) | Air Injection | Hydrogen Injection | PrefOx Effluent |
|---|---|---|---|---|
| Flow, Nm³/hr | 15,410 | 170 | 52 | 15,610 |
| Pressure, bar(g) | 12 | 12 | 12 | 11 |
| Temp, °C. | 100 | 40 | 40 | 125 |
| Composition, mol % |  |  |  |  |
| Carbon Dioxide | 98.2 |  | 0.0 | 97.2 |
| Methane | 0.9 |  | 0.1 | 0.9 |
| H2 | 0.03 |  | 99.9 | 0.1 |
| Nitrogen | 0.02 |  | 0.0 | 0.9 |
| Water | 0.6 |  | 0.0 | 0.9 |
| $O_2$ | 0.0 |  | 0.0 | <10 ppmv |
| Carbon Monoxide | 0.23 |  | <10 ppmv | <20 ppmv |

Example 2

The $CO_2$ PSA operating conditions in EXAMPLE 1 were modified by changing the $CO_2$ PSA cycle. The $CO_2$ PSA cycle in EXAMPLE 2 comprises two pressure equalization steps and one provide purge step. The provide purge step generates purge gas that is used to purge beds in the $CO_2$ PSA unit that are being regenerated at low pressure. The provide purge step in EXAMPLE 1 was performed by a co-current depressurization step after the two pressure equalization steps (i.e., at a lower pressure). As shown in TABLE 1, this results in a low hydrogen concentration in the compressed tail gas. The $CO_2$ PSA cycle was modified by performing the provide purge step before the two pressure equalization steps (i.e., at a higher pressure). As shown in TABLE 2, this change results in a higher hydrogen concentration in the compressed PSA tail gas. As a result, the hydrogen injection stream was eliminated, and the PrefOx effluent stream comprises less than 10 ppmv oxygen and less than 20 ppmv carbon monoxide.

TABLE 2

| | $CO_2$ Product from PSA Unit (Compressed Tail Gas) | Air Injection | PrefOx Effluent |
|---|---|---|---|
| Flow, $Nm^3/hr$ | 15,610 | 170 | 15,760 |
| Pressure, bar(g) | 12 | 12 | 11 |
| Temp, °C. | 100 | 40 | 125 |
| Composition, mol % | | | |
| Carbon Dioxide | 96.9 | | 96.3 |
| Methane | 0.6 | | 0.6 |
| H2 | 1.5 | | 1.3 |
| Nitrogen | 0.09 | | 0.9 |
| Water | 0.7 | | 0.9 |
| $O_2$ | 0.0 | | <10 ppmv |
| Carbon Monoxide | 0.22 | | <20 ppmv |

Accordingly, based on the foregoing, the present invention provides effective and efficient processes for removing carbon monoxide from a carbon dioxide stream without requiring additional oxygen removal.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understanding the embodiments of the present invention.

Specific Embodiments

While the following is described in conjunction with specific embodiments, it will be understood that this description is intended to illustrate and not limit the scope of the preceding description and the appended claims.

A first embodiment of the invention is a process for reducing carbon monoxide levels in a gaseous stream, the process comprising providing a carbon dioxide stream comprising greater than 90 mol % carbon dioxide, and further comprising carbon monoxide, hydrogen, and at least one of water, methane, nitrogen, or a combination thereof; mixing the carbon dioxide stream with oxygen to provide a mixed stream; passing the mixed stream to a preferential oxidation zone having a vessel containing a catalyst and being operated at a temperature of between 50 and 200° C. in order to selectively convert carbon monoxide to carbon dioxide and consume excess oxygen by reaction with hydrogen to form water. An embodiment of the invention is one, any or all of prior embodiments in this paragraph up through the first embodiment in this paragraph, wherein the oxygen is from air or from oxygen-enriched air. An embodiment of the invention is one, any or all of prior embodiments in this paragraph up through the first embodiment in this paragraph, further comprising adjusting an amount of oxygen mixed with the carbon dioxide stream such that the molar ratio of oxygen ($O_2$) to carbon monoxide is in the range of 0.5 to 2.5 moles $O_2$ per mole of carbon monoxide. An embodiment of the invention is one, any or all of prior embodiments in this paragraph up through the first embodiment in this paragraph, wherein further comprising adjusting an amount of hydrogen passed to the preferential oxidation zone. An embodiment of the invention is one, any or all of prior embodiments in this paragraph up through the first embodiment in this paragraph, wherein adjusting the amount of hydrogen comprises mixing the carbon dioxide stream with a hydrogen stream. An embodiment of the invention is one, any or all of prior embodiments in this paragraph up through the first embodiment in this paragraph, wherein the oxygen concentration in the effluent stream from the preferential oxidation zone comprises less than about 50 ppmv $O_2$. An embodiment of the invention is one, any or all of prior embodiments in this paragraph up through the first embodiment in this paragraph, wherein the carbon dioxide stream comprises a PSA tail gas stream from a PSA unit. An embodiment of the invention is one, any or all of prior embodiments in this paragraph up through the first embodiment in this paragraph, wherein adjusting the amount of hydrogen comprises changing the operating conditions of the PSA unit to increase an amount of hydrogen in the PSA tail gas stream.

A second embodiment of the invention is a process for reducing carbon monoxide levels in a gaseous stream, the process comprising providing a carbon dioxide stream comprising greater than 90 mol % carbon dioxide, and further comprising carbon monoxide, hydrogen, and at least one of water, methane, nitrogen, or a combination thereof; mixing the carbon dioxide stream with oxygen to provide a mixed stream; passing the mixed stream to a preferential oxidation zone having a vessel containing a catalyst and being operated at conditions in order to selectively convert carbon monoxide to carbon dioxide and consume excess oxygen by reaction with hydrogen to form water; and, adjusting an amount of hydrogen passed to the preferential oxidation zone so that the oxygen concentration in the effluent stream from the preferential oxidation zone is less than about 50 ppmv $O_2$. An embodiment of the invention is one, any or all of prior embodiments in this paragraph up through the second embodiment in this paragraph, wherein adjusting the amount of hydrogen comprises mixing the carbon dioxide stream with a hydrogen stream. An embodiment of the invention is one, any or all of prior embodiments in this paragraph up through the second embodiment in this paragraph, wherein the carbon dioxide stream comprises a PSA tail gas stream from a PSA unit. An embodiment of the invention is one, any or all of prior embodiments in this paragraph up through the second embodiment in this paragraph, wherein adjusting the amount of hydrogen comprises changing the operating conditions of the PSA unit to increase an amount of hydrogen in the PSA tail gas stream. An embodiment of the invention is one, any or all of prior embodiments in this paragraph up through the second embodiment in this paragraph, wherein the oxygen is from air or from oxygen-enriched air.

A third embodiment of the invention is a process for reducing carbon monoxide levels in a gaseous stream, the process comprising providing a carbon dioxide stream comprising greater than 90 mol % carbon dioxide, and further comprising carbon monoxide, hydrogen, and at least one of water, methane, nitrogen, or a combination thereof; mixing the carbon dioxide stream with oxygen to provide a mixed stream; and, passing the mixed stream to a preferential oxidation zone having a vessel containing a catalyst and being operated at conditions in order to selectively convert carbon monoxide to carbon dioxide and consume excess oxygen by reaction with hydrogen to form water, wherein the vessel containing a catalyst comprises a drier. An embodiment of the invention is one, any or all of prior embodiments in this paragraph up through the third embodiment in this paragraph, wherein further comprising adjusting an amount of hydrogen passed to the preferential oxidation zone. An embodiment of the invention is one, any or all of prior embodiments in this paragraph up through the third embodiment in this paragraph, wherein adjusting the amount of hydrogen comprises mixing the carbon dioxide stream with a hydrogen stream. An embodiment of the invention is one, any or all of prior embodiments in this paragraph up through the third embodiment in this paragraph, wherein the oxygen concentration in the effluent stream from the preferential oxidation zone comprises less than about 50 ppmv $O_2$. An embodiment of the invention is one, any or all of prior embodiments in this paragraph up through the third embodiment in this paragraph, wherein the carbon dioxide stream comprises a PSA tail gas stream from a PSA unit. An embodiment of the invention is one, any or all of prior embodiments in this paragraph up through the third embodiment in this paragraph, wherein adjusting the amount of hydrogen comprises changing the operating conditions of the PSA unit to increase an amount of hydrogen in the PSA tail gas stream. An embodiment of the invention is one, any or all of prior embodiments in this paragraph up through the third embodiment in this paragraph, wherein the mixed stream is maintained at a temperature between 60 and 100° C.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A process for reducing carbon monoxide levels in a gaseous stream, the process comprising:
   providing a carbon dioxide stream comprising greater than 90 mol % carbon dioxide, and further comprising carbon monoxide, hydrogen, and at least one of water, methane, nitrogen, or a combination thereof;
   mixing the carbon dioxide stream with oxygen to provide a mixed stream;
   passing the mixed stream to a preferential oxidation zone having a vessel containing a catalyst and being operated at a temperature of between 50 and 200° C. in order to selectively convert carbon monoxide to carbon dioxide and consume excess oxygen by reaction with hydrogen to form water; and
   adjusting an amount of hydrogen passed to the preferential oxidation zone.

2. The process of claim 1, wherein the oxygen is from air or from oxygen-enriched air.

3. The process of claim 1, further comprising adjusting an amount of oxygen mixed with the carbon dioxide stream such that a molar ratio of oxygen ($O_2$) to carbon monoxide is in a range of 0.5 to 2.5 moles $O_2$ per mole of carbon monoxide.

4. The process of claim 1, wherein adjusting the amount of hydrogen comprises mixing the carbon dioxide stream with a hydrogen stream.

5. The process of claim 1, wherein an oxygen concentration in an effluent stream from the preferential oxidation zone comprises less than about 50 ppmv $O_2$.

6. The process of claim 1, wherein the carbon dioxide stream comprises a PSA tail gas stream from a PSA unit.

7. The process of claim 6, wherein adjusting the amount of hydrogen comprises changing an operating condition of the PSA unit to increase an amount of hydrogen in the PSA tail gas stream.

8. A process for reducing carbon monoxide levels in a gaseous stream, the process comprising:
   providing a carbon dioxide stream comprising greater than 90 mol % carbon dioxide, and further comprising carbon monoxide, hydrogen, and at least one of water, methane, nitrogen, or a combination thereof;
   mixing the carbon dioxide stream with oxygen to provide a mixed stream;
   passing the mixed stream to a preferential oxidation zone having a vessel containing a catalyst and being operated at conditions in order to selectively convert carbon monoxide to carbon dioxide and consume excess oxygen by reaction with hydrogen to form water; and,
   adjusting an amount of hydrogen passed to the preferential oxidation zone so that an oxygen concentration in an effluent stream from the preferential oxidation zone is less than about 50 ppmv $O_2$.

9. The process of claim 8, wherein adjusting the amount of hydrogen comprises mixing the carbon dioxide stream with a hydrogen stream.

10. The process of claim 8, wherein the carbon dioxide stream comprises a PSA tail gas stream from a PSA unit.

11. The process of claim 10, wherein adjusting the amount of hydrogen comprises changing an operating condition of the PSA unit to increase an amount of hydrogen in the PSA tail gas stream.

12. The process of claim 8, wherein the oxygen is from air or from oxygen-enriched air.

13. A process for reducing carbon monoxide levels in a gaseous stream, the process comprising:
   providing a carbon dioxide stream comprising greater than 90 mol % carbon dioxide, and further comprising carbon monoxide, hydrogen, and at least one of water, methane, nitrogen, or a combination thereof;
   mixing the carbon dioxide stream with oxygen to provide a mixed stream; and,
   passing the mixed stream to a preferential oxidation zone having a vessel containing a catalyst and being operated at conditions in order to selectively convert carbon monoxide to carbon dioxide and consume excess oxygen by reaction with hydrogen to form water,
   wherein the vessel containing a catalyst comprises a drier.

14. The process of claim 13, wherein further comprising adjusting an amount of hydrogen passed to the preferential oxidation zone.

15. The process of claim 14, wherein adjusting the amount of hydrogen comprises mixing the carbon dioxide stream with a hydrogen stream.

16. The process of claim 14, wherein an oxygen concentration in an effluent stream from the preferential oxidation zone comprises less than about 50 ppmv $O_2$.

17. The process of claim 14, wherein the carbon dioxide stream comprises a PSA tail gas stream from a PSA unit.

18. The process of claim 17, wherein adjusting the amount of hydrogen comprises changing an operating condition of the PSA unit to increase an amount of hydrogen in the PSA tail gas stream.

19. The process of claim 13, wherein the mixed stream is maintained at a temperature between 60 and 100° C.

* * * * *